US006965949B1

(12) United States Patent
Erickson et al.

(10) Patent No.: US 6,965,949 B1
(45) Date of Patent: Nov. 15, 2005

(54) COMPUTING SYSTEM AND METHOD FOR ACCESSING A COMPUTER-READABLE MEDIUM DEVICE

(75) Inventors: Dirk Erickson, Austin, TX (US); Hong-Jing Lo, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 294 days.

(21) Appl. No.: 09/947,871

(22) Filed: Sep. 6, 2001

(51) Int. Cl.[7] ............................................. G06F 13/10
(52) U.S. Cl. ............................. 710/8; 710/10; 710/15; 710/16; 710/62; 710/72; 710/74; 713/1
(58) Field of Search ........................... 710/5, 8, 10, 16, 710/13, 15, 62, 72, 74, 63; 713/1, 2, 100

(56) References Cited

U.S. PATENT DOCUMENTS

| 5,291,585 | A |   | 3/1994  | Sato et al. |         |
|-----------|---|---|---------|-------------|---------|
| 5,586,324 | A |   | 12/1996 | Sato et al. |         |
| 5,598,577 | A | * | 1/1997  | Overfield   | 710/10  |
| 5,799,203 | A | * | 8/1998  | Lee et al.  | 710/8   |
| 5,867,730 | A | * | 2/1999  | Leyda       | 710/10  |
| 6,133,938 | A | * | 10/2000 | James       | 725/80  |
| 6,253,114 | B1| * | 6/2001  | Takihara    | 700/83  |
| 6,341,319 | B1| * | 1/2002  | Inoue et al.| 710/52  |
| 6,469,967 | B1| * | 10/2002 | Mau et al.  | 369/53.3|
| 6,532,504 | B2| * | 3/2003  | Hattori     | 710/52  |
| 6,556,219 | B1| * | 4/2003  | Wugofski    | 345/762 |
| 2001/0041044 | A1 | * | 11/2001 | Aoki et al. | 386/46 |

FOREIGN PATENT DOCUMENTS

| EP | 1 128 366 A2 | * | 8/2001 |           |
|----|--------------|---|--------|-----------|
| EP | 1128366 A2   | * | 8/2001 | G11B 7/007|

* cited by examiner

*Primary Examiner*—Ilwoo Park
(74) *Attorney, Agent, or Firm*—Haynes and Boone, LLP

(57) ABSTRACT

From a computer-readable medium device, a computing system receives a description of a feature of the computer-readable medium device. In response to the description, the computing system configures a program for managing access by the computing system to the computer-readable medium device. In response to instructions of the configured program, the computing system accesses the computer-readable medium device.

17 Claims, 2 Drawing Sheets

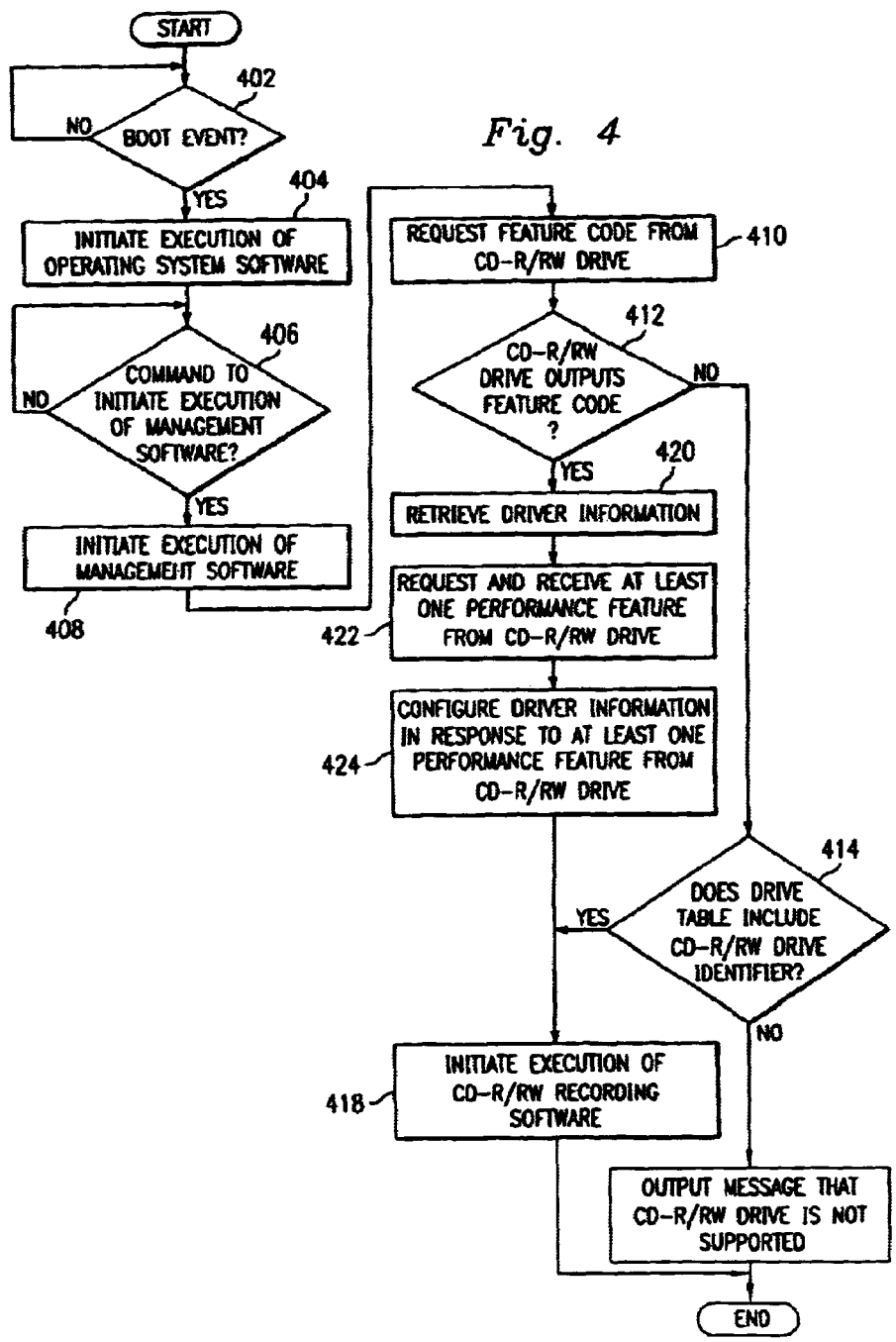

COMPUTING SYSTEM AND METHOD FOR ACCESSING A COMPUTER-READABLE MEDIUM DEVICE

BACKGROUND

The disclosures herein relate generally to information processing systems and in particular to a computing system and method for accessing a computer-readable medium device.

A computing system may include a computer-readable medium device, such as a CD-R/RW drive. Computer programs have been created for managing the computing system's access to the computer-readable medium device. For example, in response to such programs, the computing system formats, adds, modifies or deletes information (e.g. instructions, data) on the device's computer-readable medium. Nevertheless, previous techniques of such programs are inefficient.

For accessing (e.g. recording information on) a CD-R/RW drive, one conventional technique maintains a list of supported CD-R/RW drives in a static drive table (e.g. stored in the operating system registry). The drive table includes various information about the supported CD-R/RW drives, such as a drive's identification strings, features, and command behavior (such as a response to a prevent/allow medium removal (1Eh) command). If a CD-R/RW drive is not listed in the drive table (or is listed incorrectly in the drive table), the computing system either (a) does not support the drive (e.g. operates without recognition of the drive's features) or (b) provides minimal support for the drive according to predetermined assumptions (e.g. operates with recognition of a subset of the drive's features). Even if the computing system provides minimal support for the drive, the minimal support might interfere with other software operations (e.g. due to command set incompatibilities), create errors, and fail to satisfy user expectations.

Accordingly, in order to provide full support for a CD-R/RW drive that is not listed in the drive table (or is listed incorrectly in the drive table), the drive table is updated to provide support for the CD-R/RW drive. Nevertheless, such an update is potentially inefficient, especially if restorable images (or "copies") of software, tables and other information are saved for a customer's installation. This is because a change in the drive table results in more cost by compelling a revision to the saved restorable images. Moreover, computer manufacturers incur significant expense in creating, maintaining and updating numerous drivers (e.g. software for managing a computing system's access to drives) to support a wide variety of different CD-R/RW drives.

A need has arisen for a computing system and method for accessing a computer-readable medium device, in which various shortcomings of previous techniques are overcome. More particularly, a need has arisen for a computing system and method for accessing a computer-readable medium device, in which efficiency is increased relative to previous techniques.

SUMMARY

One embodiment, accordingly, provides for a computing system and method for accessing a computer-readable medium device. From the computer-readable medium device, the computing system receives a description of a feature of the computer-readable medium device. In response to the description, the computing system configures a program for managing access by the computing system to the computer-readable medium device. In response to instructions of the configured program, the computing system accesses the computer-readable medium device.

A principal advantage of this embodiment is that various shortcomings of previous techniques are overcome, and efficiency is increased relative to previous techniques.

BRIEF DESCRIPTION OF THE DRAWING

FIG. 4 is a flowchart of operation of the representative computing system of FIG. 2 in accessing a computer-readable medium device.

DETAILED DESCRIPTION

Figure 1:
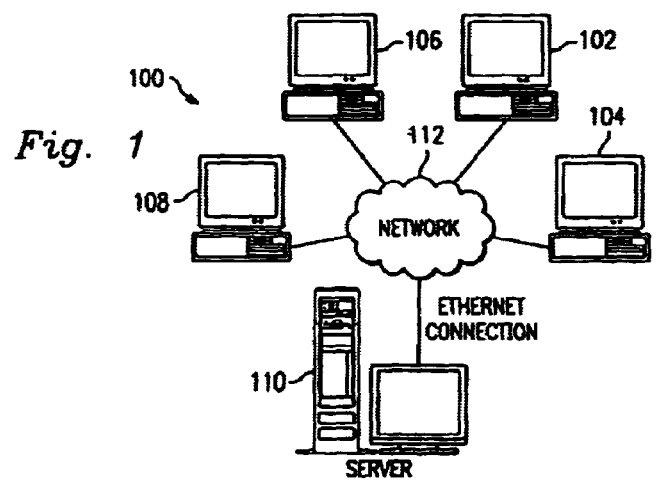
FIG. 1 is a block diagram of a system according to the illustrative embodiment.

FIG. 1 is a block diagram of a system, indicated generally at 100, according to the illustrative embodiment. System 100 includes (a) computing systems 102, 104, 106 and 108, and (b) a server 110 (which is also a computing system) for installing software onto computing systems 102, 104, 106 and 108 as part of a build-to-order process, as discussed further hereinbelow. Further, system 100 includes a conventional network 112, such as an ethernet network.

Each of computing systems 102, 104, 106 and 108, and server 110 includes respective network interface circuitry for communicating with network 112 (i.e. outputting information to, and receiving information from, network 112), such as by transferring information (e.g. instructions, data, signals) between such computing system (or server) and network 112. As shown in FIG. 1, server 110 is coupled through network 112 to each of computing systems 102, 104, 106 and 108. Accordingly, through network 112, server 110 communicates with computing systems 102, 104, 106 and 108, and vice versa.

For clarity, FIG. 1 depicts four computing systems 102, 104, 106 and 108, although system 100 may include additional computing systems. For explanatory purposes, computing system 102 is a representative one of computing systems 102, 104, 106 and 108. Each of computing systems 102, 104, 106 and 108, and server 110 includes at least one respective computing device (e.g. computer) for executing a respective process and performing respective operations (e.g. processing and communicating information) in response thereto as discussed further hereinbelow. Each such computing system and computing device is formed by various electronic circuitry components.

In the illustrative embodiment, the computing devices of computing systems 102, 104, 106 and 108, are personal computers (e.g. IBM-compatible personal computers ("PCs")) that execute Microsoft Windows operating system ("OS") software. Also, in the illustrative embodiment, the computing device of server 110 is a server computer that executes Microsoft Windows NT OS software. Alternatively, any one or more of the computing devices of system 100 is any type of computer that executes any type of OS. All Microsoft products identified herein are available from Microsoft Corporation, One Microsoft Way, Redmond, Wash. 98052-6399, telephone (425) 882-8080.

Figure 2:
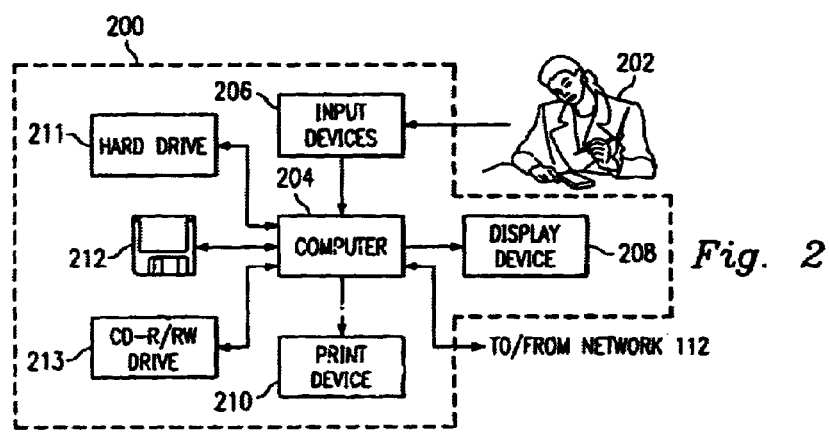
FIG. 2 is a block diagram of a representative one of the computing systems of the system of FIG. 1.

FIG. 2 is a block diagram of a representative one of the computing systems of system 100. Such representative computing system is indicated by dashed enclosure 200. Each of the computing systems of system 100 operates in association with a respective human user. Accordingly, in the example of FIG. 2, computing system 200 operates in association with a human user 202, as discussed further hereinbelow.

As shown in FIG. 2, computing system 200 includes (a) input devices 206 for receiving information from human user 202, (b) a display device 208 (e.g. a conventional electronic cathode ray tube ("CRT") device) for displaying information to user 202, (c) a computer 204 for executing and otherwise processing instructions, and (d) a print device 210 (e.g. a conventional electronic printer or plotter). Also, computing system 200 includes various computer-readable medium devices (or apparatus), as discussed further hereinbelow, such as (a) a nonvolatile hard drive 211 for storing information, (b) a portable floppy diskette 212 for storing information, and (c) a compact disc read/read-write ("CD-R/RW") drive 213 for storing information. A computer-readable medium device includes a computer-readable medium. Moreover, computing system 200 includes various other electronic circuitry for performing other operations of computing system 200.

For example, computer 204 includes network interface circuitry for communicating between computer 204 and network 112. As shown in FIG. 2, computer 204 is connected to network 112, input devices 206, display device 208, print device 210, hard drive 211, floppy diskette 212, and CD-R/RW drive 213.

For example, in response to signals from computer 204, display device 208 displays visual images, and user 202 views such visual images. Moreover, user 202 operates input devices 206 in order to output information to computer 204, and computer 204 receives such information from input devices 206. Also, in response to signals from computer 204, print device 210 prints visual images on paper, and user 202 views such visual images.

Input devices 206 include, for example, a conventional electronic keyboard and a pointing device such as a conventional electronic "mouse," rollerball or light pen. User 202 operates the keyboard to output alphanumeric text information to computer 204, and computer 204 receives such alphanumeric text information from the keyboard. User 202 operates the pointing device to output cursor-control information to computer 204, and computer 204 receives such cursor-control information from the pointing device.

Figure 3:
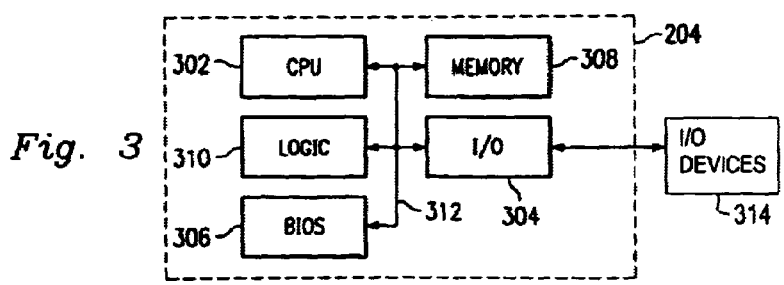
FIG. 3 is a block diagram of a computer of the representative computing system of FIG. 2.

FIG. 3 is a block diagram of computer 204, which is formed by various electronic circuitry components. Accordingly, as shown in FIG. 3, computer 204 includes a central processing unit ("CPU") 302 for executing and otherwise processing instructions, input/output ("I/O") controller circuitry 304, a basic input output system ("BIOS") electrically erasable programmable read only memory device ("EEPROM") 306 for storing information (e.g. firmware instructions), a memory 308 such as random access memory device ("RAM") and read only memory device ("ROM") for storing information (e.g. instructions executed by CPU 302 and data operated upon by CPU 302 in response to such instructions), and other miscellaneous electronic circuitry logic 310 for performing other operations of computer 204, all coupled to one another through one or more buses 312. Also, computer 204 may include various other components that, for clarity, are not shown in FIG. 3.

As shown in FIG. 3, I/O controller circuitry 304 is coupled to I/O devices 314. I/O devices 314 include, for example, network 112, input devices 206, display device 208, print device 210, hard drive 211, floppy diskette 212, and CD-R/RW drive 213. Accordingly, I/O controller circuitry 304 includes the network interface circuitry (as discussed hereinabove in connection with FIGS. 1 and 2) and other controller circuitry for operating I/O devices 314, reading information from I/O devices 314, and writing information to I/O devices 314. For example, I/O controller circuitry 304 outputs signals to CD-R/RW drive 213, and CD-R/RW drive 213 receives, stores and/or outputs such information in response to such signals.

Computer 204 operates its various components (e.g. I/O controller circuitry 304) in response to information stored by BIOS 306. For example, I/O controller circuitry 304 outputs various interrupt requests ("IRQs"), and computer 204 reacts to such IRQs in response to information stored by BIOS 306. Accordingly, by suitably modifying information stored by BIOS 306, one or more components of computer 204 may be effectively disabled, so that computer 204 operates without reference to such components. In such a situation where a component is disabled, computer 204 would not react to an IRQ from such a disabled component, and computer 204 would not allocate resources to such a disabled component.

FIG. 4 is a flowchart of operation of computing system 200 in accessing CD-R/RW drive 213. In the illustrative embodiment, computing system 200 executes a program for accessing CD-R/RW drive 213. The program and CD-R/RW drive 213 comply with a predetermined "Round Rock" specification (as discussed further hereinbelow in the Appendix) of the illustrative embodiment. The Round Rock specification includes a predetermined "Round Rock Feature Descriptor" and predetermined command response behavior by CD-R/RW drive 213. In addition to CD-R/RW drives, the Round Rock specification is applicable to CD-ROM (i.e. compact disc read only memory) drives, and its principles are likewise applicable to DVD drives, including DVD read-write drives and DVD read only drives.

According to the Round Rock specification, computer 204 initially accesses CD-R/RW drive 213 before receiving information about particular features of CD-R/RW drive 213. During such access, computer 204 outputs a request to CD-R/RW drive 213, and CD-R/RW drive 213 outputs the information to computer 204 in response thereto. The information describes particular features of CD-R/RW drive 213, such as (a) the drive's write capabilities (e.g. speed and an indication of whether the drive executes a predetermined write strategy for its computer-readable medium), (b) an indication of whether the drive performs buffer under-run free recording, and (c) the drive's digital audio extraction capabilities (e.g. speed), according to a predetermined format of the Round Rock Feature Descriptor.

In response to the information, computer 204 configures a driver (or "program") for >managing access by computer 204 to CD-R/RW drive 213. In that manner, computer 204 advantageously operates (a) without relying on a list of supported CD-R/RW drives in a static drive table, (b) with full support for particular features of CD-R/RW drive 213, and (c) with a single configured driver (instead of multiple drivers) to support a wide variety of different CD-R/RW drives. In one example of the illustrative embodiment, the pre-configured driver is received by computer 200 from server 110 through network 112.

Before and after configuring the driver, computer 204 operates with recognition of a predetermined subset of features, which are shared by the wide variety of different CD-R/RW drives. In one example of the illustrative embodiment, the predetermined subset of features is a command set behavior of the different CD-R/RW drives. Such command set behavior includes the behavior of CD-R/RW drive 213 in outputting the information (e.g. about particular features of CD-R/RW drive 213) in response to the request from computer 204. In response to the information, computer 204 suitably configures the driver to operate with recognition of a variable subset of features (which are particular features of CD-R/RW drive 213).

Accordingly, computer 204 advantageously operates without relying on updates to the drive table for supporting new versions of CD-R/RW drives. In that manner, computer manufacturers are empowered to introduce new versions of CD-R/RW drives without compelling a revision to saved restorable images for a customer's installation, thereby reducing cost. For example, if incompatibilities are discovered between the CD-R/RW drive and computer 204 (or software of computer 204), such incompatibilities may be resolved in a new version of the CD-R/RW drive (e.g. a new version of firmware in the CD-R/RW drive).

Computer 204 likewise achieves such advantages if drive 213 is a CD-ROM drive instead of a CD-R/RW drive. For example, according to the Round Rock specification, the CD-ROM drive outputs (to computer 204) its digital audio extraction rates, so that computer 204 is not required to dynamically measure such rates. Applicability of the Round Rock specification to CD-ROM drives is discussed further hereinbelow in the Appendix.

Referring to FIG. 4, the operation starts at a step 402, which self-loops until a boot event. A computer, such as computer 204, is "booted" (or "rebooted") when it initiates execution of operating system software (e.g. Microsoft Windows) in response to an event ("boot event"). Such a boot event may be, for example, user 202 "turning on" computer 204 (e.g. user 202 causing application of electrical power to computer 204 by switching an on/off button of computer 204). Alternatively, such a boot event may be receipt by computer 204 of a command to initially execute the operating system software. For example, computer 204 may receive such a command from user 202 (e.g. through input devices 206), or from a computer application executed by computer 204, or from another computer (e.g. from server 110 through network 112).

In response to a boot event, the operation continues from step 402 to a step 404, where computer 204 initiates execution of operating system software. After step 404, the operation continues to a step 406, which self-loops until computer 204 receives a command to initiate execution of management software (e.g. CD-R/RW drive management software). In response to such a command, the operation continues to a step 408, where computer 204 initiates execution of management software.

After step 408, the operation continues to a step 410, where computer 204 (in response to instructions of the management software) outputs at least one signal to CD-R/RW drive 213. The signal represents a request by computer 204 for CD-R/RW drive 213 to output a Round Rock feature code to computer 204, as discussed further hereinbelow in Table 1 of the Appendix. After step 410, the operation continues to a step 412, where computer 204 (in response to instructions of the management software) determines whether CD-R/RW drive 213 satisfies the request.

If CD-R/RW drive 213 fails to satisfy the request, the operation continues to a step 414. At step 414, computer 204 (in response to instructions of the management software) determines whether CD-R/RW drive 213 is identified in a static drive table of computer 204 (which includes a list of supported CD-R/RW drives). The drive table includes various information about the supported CD-R/RW drives, such as a drive's identification strings, features, and command behavior (such as a response to a prevent/allow medium removal (1Eh) command).

At step 414, if computer 204 determines that CD-R/RW drive 213 is not listed in the drive table, the operation continues to a step 416. At step 416, computer 204 (in response to instructions of the management software) outputs a message (e.g. to user 202 via display device 208) that CD-R/RW drive 213 is not supported. After step 416, the operation of FIG. 4 ends (or "finishes" or "completes").

Conversely, at step 414, if computer 204 determines that CD-R/RW drive 213 is listed in the drive table, the operation continues to a step 418. At step 418, computer 204 (in response to instructions of the management software) initiates execution of access (e.g. recording) software for CD-R/RW drive 213. After step 418, the operation of FIG. 4 ends.

Referring again to step 412, if CD-R/RW drive 213 satisfies the request (of step 410), thereby indicating that CD-R/RW drive 213 complies with the Round Rock specification, the operation continues to a step 420. At step 420, computer 204 (in response to instructions of the management software) retrieves the pre-configured driver (e.g. previously stored by a computer-readable medium of computing system 200). After step 420, the operation continues to a step 422, where computer 204 (in response to instructions of the management software) outputs at least one signal to CD-R/RW drive 213. The signal represents a request by computer 204 for CD-R/RW drive 213 to output a Round Rock feature descriptor to computer 204, as discussed further hereinbelow in Table 2 of the Appendix.

Also, at step 422, computer 204 receives the Round Rock feature descriptor from CD-R/RW drive 213 (in satisfaction of the request). As discussed further hereinbelow in the Appendix, the Round Rock feature descriptor (or "description") includes various performance features of CD-R/RW drive 213. After step 422, the operation continues to a step 424.

At step 424, in response to information in the Round Rock feature descriptor (received from CD-R/RW drive 213), computer 204 (in response to instructions of the management software) configures the driver (retrieved at step 420) for managing access by computer 204 to CD-R/RW drive 213. After step 424, the operation continues to step 418. At step 418, computer 204 (in response to instructions of the management software) initiates execution of access (e.g. recording) software for CD-R/RW drive 213. After step 418, the operation of FIG. 4 ends.

By initiating execution of the access software at step 418, computer 204 supports CD-R/RW drive 213 by operating in relation to CD-R/RW drive 213, according to the drive's identification strings, features, and command behavior, (a) with at least partial support and recognition of at least a subset of the drive's features if step 418 is preceded by step 414, and (b) with full support and recognition of all of the drive's features if step 418 is preceded by step 424.

Referring again to FIG. 2, computer 204 is structurally and functionally interrelated with the computer-readable media of system 200 as described further hereinbelow. Each computing device of the illustrative embodiment is structurally and functionally interrelated with respective computer-readable media, similar to the manner in which computer 204 is structurally and functionally interrelated with the computer-readable media of system 200. In that regard, the computer-readable media of system 200 are representative of such computer-readable media of system 100.

In the illustrative embodiment, the computer-readable media store (or encode, or record, or embody) functional descriptive material (e.g. including but not limited to software (also referred to as computer programs or applications or routines) and data structures). Such functional descriptive material imparts functionality when encoded on the computer-readable media. Also, such functional descriptive material is structurally and functionally interrelated to the computer-readable media.

Within such functional descriptive material, data structures define structural and functional interrelationships between such data structures and the computer-readable media (and other aspects of computer 204, computing system 200 and system 100). Such interrelationships permit the data structures' functionality to be realized. Also, within such functional descriptive material, computer programs define structural and functional interrelationships between such computer programs and the computer-readable media (and other aspects of computer 204, computing system 200 and system 100). Such interrelationships permit the computer programs' functionality to be realized.

For example, computer 204 accesses such functional descriptive material from the computer-readable media into the memory device of computer 204, and computer 204 performs its operations (as described elsewhere herein) in response to such material which is stored in the memory device of computer 204. More particularly, computer 204 performs the operation of processing a computer application (that is stored, encoded, recorded or embodied on one or more computer-readable media) for causing computer 204 to perform additional operations (as described elsewhere herein). Accordingly, such functional descriptive material exhibits a functional interrelationship with the way in which computer 204 executes its processes and performs its operations.

Further, the computer-readable media are apparatus from which the computer application is accessible by computer 204, and the computer application is processable by computer 204 for causing computer 204 to perform such additional operations. In addition to reading such functional descriptive material from the computer-readable media, computer 204 is capable of reading such functional descriptive material from (or through) network 112 which is also a computer-readable medium (or apparatus). Moreover, the memory device of computer 204 is itself a computer-readable medium (or apparatus).

Although illustrative embodiments have been shown and described, a wide range of modification, change and substitution is contemplated in the foregoing disclosure and, in some instances, some features of the embodiments may be employed without a corresponding use of other features. Accordingly, it is appropriate that the appended claims be construed broadly and in a manner consistent with the scope of the embodiments disclosed herein.

APPENDIX

I. Round Rock Feature Descriptor

Drives that support the Round Rock Feature Set shall support the Round Rock Feature and Feature Descriptor as defined below. This feature is valid for writable and read-only devices. The value of each field for a read only device is defined below.

TABLE 1

Additional Feature Code

| Feature Code | Feature Name | Description |
| --- | --- | --- |
| FFDEh | Round Rock | Supports the Round Rock feature set. |

TABLE 2

Round Rock Feature Descriptor Format

| Byte | Bit 7 | 6 | 5 | 4 | 3 | 2 | 1 | 0 |
| --- | --- | --- | --- | --- | --- | --- | --- | --- |
| 0 | (MSB) | | | Feature Code = FFDEh | | | | |
| 1 | | | | | | | | (LSB) |
| 2 | Reserved | | Version | | Persistent | | Current | |
| 3 | Additional Length (12 + (4*maximum number of n) + (4*maximum number of m)) | | | | | | | |
| 4 | 2A Write Speed | Reserved | | HSRW | | BUFE Disable | | Write Strategy Known |
| 5 | (MSB) | | | | | | | |
| 6 | | | | OSJ Disc Identification Code | | | | |
| 7 | | | | | | | | (LSB) |
| 8 | | | | Reserved | | | | |
| 9 | | | Reserved | | Rotation Control Selected | | | |
| 10 | (MSB) | | Current Write Speed (Kbytes/sec) | | | | | |
| 11 | | | | | | | | (LSB) |
| 12 | (MSB) | Number of Logical Unit Write Speed Performance | | | | | | |
| 13 | Descriptor Tables (n) | | | | | | | (LSB) |
| if n > 0, 14 + ((n − 1)*4)~ 17 + ((n − 1)*4) | Logical Unit Write Speed Performance Descriptor Block #n | | | | | | | |
| x x + 1 | (MSB) | Number of Logical Unit DAB Speed Performance | | | | | | |
| | Descriptor Tables (m) | | | | | | | (LSB) |
| if m > 0, (x + 2) + ((m − 1)*4)~ (x + 5) + ((m − 1)*4) | Logical Unit DAB Speed Performance Descriptor Block #m | | | | | | | |

In Table 2, x=14 if n=0, or x=(18+((n−1)*4)) if n>0.
The Feature Code field shall be set to FFDEh.
The Version Field shall be set to 0001b.

The Persistent bit shall be set to zero. The returned data in this feature shall change to indicate the correct parameters for the inserted media.

The Current bit shall indicate when the returned data is valid. The returned data shall be current at all times when media is present and the drive's Logical Unit reports that it is ready to be accessed. The returned data shall also be current when the Logical Unit reports that no media is present.

The 2A Write Speed bit shall indicate whether write speed information can be found in Mode Page 2Ah (C/DVD Capabilities and Mechanical Status Page Format) in accordance with the X3T10-1048D Rev 10a SCSI-3 MMC specification ("MMC-3") or later versions thereof. If this bit is set, the Logical Unit shall maintain accurate information in both the Round Rock Feature Descriptor and Mode Page 2A. For a read only device, this bit shall be cleared.

The HSRW bit indicates whether the Logical Unit can write to High Speed CD-RW media. If this bit is set, the Logical Unit is able to write to High Speed CD-RW media. If cleared, the Logical Unit does not support writing to High Speed CD-RW media. If the Logical Unit does not support writing to High Speed CD-RW media, it shall treat the media as read only and shall follow all requirements for read only media in this Appendix.

The BUFE Disable bit shall indicate whether the Logical Unit has the ability to disable the Buffer Under-run Free recording function. If this bit is set, the Logical Unit shall be able to disable the function and the Logical Unit shall use the BUFE bit in byte 2/bit 6 of Mode Page 05h (Write Parameters Mode Page) to enable/disable the function. The BUFE bit shall be valid for any rewritable or recordable media on which the Logical Unit supports Buffer Under-run Free recording. If the bit is cleared, the Logical Unit does not support disabling Buffer Under-run Free recording.

Buffer Under-run Free recording shall be enabled in the Logical Unit by default and shall always operate in that mode unless disabled by the host computing system.

The Write Strategy Known bit shall indicate whether the Logical Unit supports a known write strategy for the inserted media. The Logical Unit shall set this bit if it recognizes the type of media inserted and will use a customized write strategy to write data to the media. This bit shall also be set if the Logical Unit will use a calculated write strategy from parameters reported by the media. This bit shall be cleared if the Logical Unit does not recognize the media and/or will use a default write strategy to record data to the media. This bit shall be cleared when no media, read only media, or closed CD-R media is present in the drive. This be shall be cleared for a read only device. For requirements defined by this Appendix, closed CD-R media shall be treated as read only media.

The OSJ Disc Identification Code field shall contain the OSJ assigned identification number for the manufacturer and type of media that is inserted in the Logical Unit. A value of 000000h shall indicate that this field is not supported or the identification code cannot be determined. The OSJ Disc Identification Code shall be represented in hexidecimal.

The description of Bytes 8 through (17+(n−1)*4) is taken from a proposal to MMC-3. It is repeated in the Round Rock Feature Descriptor for early adoption purposes. If there is a discrepancy between this Appendix and MMC-3, this Appendix should be followed for the Round Rock Feature Descriptor information. Mode Page 2A shall follow the latest version of the MMC document.

The Rotation Control Selected field indicates the actual Rotation Control to the current disc. The values of this field are defined in Table 3 as follows.

TABLE 3

Rotational Control field definition

| Value | Definition |
| --- | --- |
| 00b | CLV Recording |
| 01b | CAV Recording |
| 10b–11b | Reserved |

The Current Write Speed Selected field indicates the actual data rate that the Logical Unit is using. This field shall be set to 0000h for read only devices, if read only media is inserted, or if no media is present.

Number of Drive Write Speed Performance Descriptor Tables field specifies the number of Logical Unit Write Speed Performance Descriptor Blocks that follow this field. If the Logical Unit does not support writing to CD-R/RW media (e.g. read only device), this field shall be set to 0000h and the Number of Logical Unit DAE Speed Performance Descriptor Tables field shall immediately follow in byte 13.

Each Logical Unit Write Speed Performance Descriptor Block shall contain rotation control information (as defined in Table 3) and write speed that is supported by the Logical Unit.

The Logical Unit Write Speed Performance Descriptor Block is structured as shown in Table 4.

TABLE 4

Logical Unit Write Speed Performance Descriptor Table format

| Byte | Bit | | | | | | | |
| --- | --- | --- | --- | --- | --- | --- | --- | --- |
| | 7 | 6 | 5 | 4 | 3 | 2 | 1 | 0 |
| 0 | Reserved | | | | | | | |
| 1 | Reserved | | | | Rotation Control | | | |
| 2 | (MSB) | Write Speed Supported (Kbytes/sec) | | | | | | |
| 3 | | | | | | | | (LSB) |

The Write Speed Supported field indicates the write speed that is supported by the Logical Unit. In the case of CAV recording, the returned value shall indicate the speed at most inner program area of the disc.

The Logical Unit shall report the supported recording speed in descending order. If the Logical Unit supports both CLV and CAV on the medium, then the Logical Unit shall report all CLV descriptors first.

In the case of no recordable media or read only media mounted, the Logical Unit Write Speed Performance Descriptor Table shall report the maximum recording speed.

Number of Drive DAE Speed Performance Descriptor Tables field specifies the number of Logical Unit DAE Speed Performance Descriptor Blocks that follow this field. If the Logical Unit does not support Digital Audio Extraction, this field shall be set to 0000h.

Each Logical Unit DAE Speed Performance Descriptor Block shall contain rotation control information (as defined in Table 3) and digital audio extraction speed that is supported by the Logical Unit.

The Logical Unit DAE Speed Performance Descriptor Block is structured as shown in Table 5.

TABLE 5

Logical Unit DAE Speed Performance Descriptor Table format

| Byte | 7 | 6 | 5 | 4 | 3 | 2 | 1 | 0 |
|---|---|---|---|---|---|---|---|---|
| 0 | Reserved | | | | | | | |
| 1 | | Reserved | | | | Rotation Control | | |
| 2 | (MSB) | DAE Speed Supported (kbytes/sec) | | | | | | |
| 3 | | | | | | | | (LSB) |

The DAE Speed Supported field indicates the Digital Audio Extraction speed that is supported by the Logical Unit. In the case of CAV recording, the returned value shall indicate the speed at most inner program area of the disc.

The Logical Unit shall report the supported digital audio extraction ("DAE") speed in descending order. If the Logical Unit supports both CLV and CAV reading methods, then the Logical Unit shall report all CLV descriptors first.

In the case of no CD-DA media mounted, the Logical Unit DAE Speed Performance Descriptor Table shall report the maximum extraction speed.

II. Command Set Behavior

Specification Compliance All Round Rock-compliant drives shall comply fully with the *X3T10-1048D Rev 10a SCSI-3 MMC* document. The drive shall meet all requirements specified in the *IMAPI Device Command Specification* from Microsoft Corporation, dated Sep. 22, 2000 or later. Other specifications shall be followed as outlined in the following portions of this Appendix.

Mode Sense/Select

The drive shall meet the following requirements for the Mode Sense and Mode Select commands.

1. The drive shall respond to a Mode Sense/Select command containing a non-supported Mode Page Code with a CHECK CONDITION and a May 24, 2000 Sense Code. Under no circumstance shall a drive hang in this case.

2. The drive shall support Page Code 01h, Read/Write Error Recovery Parameters Mode Page. The value of the Disable Transfer on Error ("DTE") bit shall be zero.

3. The drive shall support Page Code 05h, Write Parameters Mode Page, and follow all requirements specified in the IMAPI Device Command Specification document. If Buffer Under-run Free recording is supported and the BUFE Disable bit is set in the Round Rock Feature descriptor page, the drive shall use the BUFE bit as defined in this page. This bit shall be valid for CD media.

4. The drive shall support Page Code 2Ah, CD Capabilities and Mechanical Status Mode Page, and have valid and accurate data in every field, current for the inserted media. The drive shall support the CDDA Stream Accurate bit. Reporting this feature as supported indicates that the drive has the capability of returning data from the exact addressed location (e.g. issuing two READ CD commands to the same location (non-sequentially) will result in the same data being returned). The drive shall also support C2 Pointers and set the C2 Pointers Supported bit in this Mode Page. The drive shall set the BUF bit in byte 7 to indicate whether Buffer Under-run Free recording is supported. If Buffer Under-run Free recording is supported, the drive shall support this function for both test and actual writing.

Persistent Method

The drive shall support the Persistent Method defined in the Removable Medium Feature (0003h) set, in the Prevent/Allow Medium Removal (1Eh) command, in the Start/Stop Unit (1Bh) command, and in the Get Event Status Notification (4Ah) command.

The drive shall support the Start/Stop Unit (1Bh) command and the Prevent/Allow Medium Removal (1Eh) command as defined in SFF-8090 Version 5. Refer to Table 6 and Table 7 for more information on the Prevent/Allow Medium Removal command behavior.

Device Busy

The drive must support the Device Busy requirements stated in the *IMAPI Device Command Specification* document. The drive should pass the HCT tests that apply to this GESN event.

Immediate Command Polling

Polling for completion of long immediate commands shall be done with the Read Disc Information (51h) command as stated by SFF8090 v5. If a Close Track/Session (5B) command or a Blank (A1h) command is being executed, a Read Disc Information (51h) command shall fail with a CHECK CONDITION and a Sense Code of 02h/04h/08h.

If a Close Track/Session (5B) command or a Blank (A1h) command is being executed, a Test Unit Ready (00h) command shall fail with a CHECK CONDITION and a Sense Code of 02h/04h/08h.

Set CD Speed

The drive shall support the Set CD Speed (BBh) command. If the host computing system requests a value for the Logical Unit Read Speed or Logical Unit Write Speed that is not supported by the drive, the drive shall set the speed to the closest supported speed. If the value is less than the lowest supported speed, the drive shall set the speed to the lowest support speed. In all cases, the drive shall execute the command without spinning down. In the case of CAV recording or CAV Digital Audio Extraction, the specified value shall indicate the speed at most inner program area of the disc.

READ TOC/ATIP/PMA

The drive shall fully support the READ TOC/ATIP/PMA (43h) command as defined in MMC-3.

BLANK Command

The drive shall fully support the BLANK (A1h) command as defined in MMC-3. In addition to all mandatory Blanking Types, the drive shall also support Blanking Type 101b, Unclose the Last Session.

Force Unit Access

The drive shall support the Force Unit Access ("FUA") bits in the WRITE_10 (2Ah) and WRITE_12 (AAh) commands as defined in MMC-3. Setting the FUA bit to one indicates that the Logical Unit shall access the media in performing the command prior to returning GOOD status. An FUA bit of zero indicates that the Logical Unit may satisfy the command by accessing the cache memory.

III. Critical Supported Features

The drive shall support the following features:
  Disc At Once (cue sheet method)
  Session At Once
  CD-Text

IV. Prevent/Allow Medium Removal Behavior

The Prevent/Allow Medium Removal command must obey the following tables.

TABLE 6

Actions for Lock/Unlock/Eject (Persistent bit = 0)

| Operation | Locked/ Unlocked | If Drive Not Ready (No Media) | If Drive Ready (Media Present) |
|---|---|---|---|
| Unlock (Prevent = 0) | Unlocked | No Error | No Error |
|  | Locked | No Error, Now media may be inserted | No Error, Now media may be removed |
| Lock (Prevent = 1) | Unlocked | No Error, Drive door locked and will not allow media to be inserted | No Error, Drive door locked and will not allow media to be removed |
|  | Locked | No Error | No Error |
| Lock when the drive does not support a Locking Mechanism | Would always be Unlocked | CHECK CONDITION Status, 5/24/00 INVALID FIELD IN CDB | CHECK CONDITION Status, 5/24/00 INVALID FIELD IN CDB |
| Eject (START/STOP UNIT command with LoEj set) | Unlocked | No Error and Tray is opened if a tray exists | No Error: Media Ejects |
|  | Locked | CHECK CONDITION Status, 2/53/02 MEDIUM REMOVAL PREVENTED, | CHECK CONDITION Status, 5/53/02 MEDIUM REMOVAL PREVENTED |
| Manual Eject | Unlocked | Tray opens (if tray exists) | Media is Ejected |
|  | Locked | No operation occurs by eject mechanism, EjectRequest event is generated | No operation by eject mechanism, EjectRequest event is generated, Media stays locked in drive |
| Close Tray (if Tray exists) | Unlocked | Tray closes, Drive door remains unlocked | Tray closes, Drive door remains unlocked |
|  | Locked (condition can only occur if Prevent/ Allow with Prevent = 1 is issued while tray is open) | Tray closes, drive door locks | Tray closes, Drive door locks |

TABLE 7

Actions for Lock/Unlock/Eject (Persistent bit = 1)

| Operation | Locked/ Unlocked | If Drive Not Ready (No Media) | If Drive Ready (Media Present) |
|---|---|---|---|
| Unlock (Prevent = 0) | Unlocked | No Error, Persistent Prevent state cleared | No Error, Persistent Prevent state cleared |
|  | Locked | No Error, Persistent Prevent state cleared, Now media may be inserted | No Error, Persistent Prevent state cleared, Now media may be removed |
| Lock (Prevent = 1) | Unlocked | No Error, Drive door locked and will not allow media to be inserted | No Error, Drive door locked and will not allow media to be removed |
|  | Locked | No Error | No Error |
| Lock when the drive does not support a Locking Mechanism | Would always be Unlocked | CHECK CONDITION Status, 5/24/00 INVALID FIELD IN CDB | CHECK CONDITION Status, 5/24/00 INVALID FIELD IN CDB |
| Eject (START/STOP UNIT command with LoEj set) | Unlocked | No Error and Tray is opened if a tray exists | No Error: Media Ejects |
|  | Locked | No Error and Tray is opened if a tray exists. Persistent Prevent state is not cleared. | No Error and Tray is opened if a tray exists. Persistent Prevent state is not cleared. |
| Manual Eject | Unlocked | Tray opens (if tray exists) | Media is Ejected |
|  | Locked | No operation occurs by eject | No operation by eject |

TABLE 7-continued

Actions for Lock/Unlock/Eject (Persistent bit = 1)

| Operation | Locked/ Unlocked | If Drive Not Ready (No Media) | If Drive Ready (Media Present) |
|---|---|---|---|
| | | mechanism, EjectRequest event is generated | mechanism, EjectRequest event is generated, Media stays locked in drive |
| Close Tray (if Tray exists) | Unlocked | Tray closes, Drive door remains unlocked | Tray closes, Drive door remains unlocked |
| | Locked | Tray closes, Drive door remains unlocked | Tray closes, Drive door automatically locks (no PREVENT/ALLOW MEDIUM REMOVAL command is necessary to lock Tray) after the Logical Unit reports the NEW MEDIA event. |

V. Write/DAE Performance Descriptor Block Example

The below example is of a 8×/4×/24× drive with maximum DAE speed of 10×CAV. The drive can write to CD-R media at 8×, 4×, and 2× and can write to CD-RW media at 4× and 2×.

TABLE 8

Write/DAE Performance Descriptor Blocks Example

| | Open CD-R Media | | CD-RW Media | | Read Only/ Closed/No Media | | CD-DA Media | |
|---|---|---|---|---|---|---|---|---|
| | Byte | Value | Byte | Value | Byte | Value | Byte | Value |
| Number of Logical Unit Write Speed Performance Descriptor Table (n) | 11/12 | 0003h | 11/12 | 0002h | 11/12 | 0001h | 11/12 | 0001h |
| Logical Unit Write Speed Performance Descriptor Block #1 | 13 | Reserved | 13 | Reserved | 13 | Reserved | 13 | Reserved |
| | 14 | 00h | 14 | 00h | 14 | 00h | 14 | 00h |
| | 15/16 | 04B0h[1] | 15/16 | 0258h | 15/16 | 04B0h | 15/16 | 04B0h |
| Logical Unit Write Speed Performance Descriptor Block #2 | 17 | Reserved | 17 | Reserved | | | | |
| | 18 | 00h | 18 | 00h | | | | |
| | 19/20 | 0258h | 19/20 | 012Ch | | | | |
| Logical Unit Write Speed Performance Descriptor Block #3 | 21 | Reserved | | | | | | |
| | 22 | 00h | | | | | | |
| | 23/24 | 012Ch | | | | | | |
| Number of Logical Unit DAE Speed Performance Descriptor Table (m) | 25/26 | 0001h | 21/22 | 0001h | 17/18 | 0001h | 17/18 | 0001h |
| Logical Unit DAE Speed Performance Descriptor Block #1 | 27 | Reserved | 23 | Reserved | 19 | Reserved | 19 | Reserved |
| | 28 | 01h | 24 | 01h | 20 | 01h | 20 | 01h |
| | 29/30 | 05DCh | 25/26 | 05DCh | 21/22 | 05DCh | 21/22 | 05DCh |

[1]The value in the Write Speed Supported field may vary per drive.

VI. Use of Round Rock in Read Only Devices

The Round Rock Feature Set may be used on read only devices where appropriate. The intended use would be to eliminate the need to dynamically measure Digital Audio Extraction rates and to ensure proper compliance to industry specifications.

For the Round Rock Feature Descriptor, the read only device shall follow the description in connection with the Round Rock Feature Descriptor portion of this Appendix. In the following portions of this Appendix, all values for read only devices are specified. Notably, the Logical Unit DAE Speed Performance Descriptor Blocks shall be accurate and always current as this will be the main area of interest to the host computing system.

The read only device shall follow the requirements listed in the Command Set Behavior portion of this Appendix. The read only device is not required to support Mode Page 5h, Write Parameters Page, nor any other command that is not intended for read only devices. All other commands and behaviors, such as the Persistent Method, SET CD SPEED, and READ TOC/ATIP/PMA shall be supported. The read only device shall closely obey the requirements regarding the CDDA Stream Accurate and C2 Pointer Supported bits in Mode Page 2A.

The read only device is not required to support any of the Critical Supported Features portion of this Appendix, except for having the ability to read CD Text information.

What is claimed is:

1. A method performed by a computing system, the method comprising:
   reporting write capabilities and digital audio extraction capabilities;
   unifying command set behavior of CD-R/RW drives in the system; and specifying a minimum set of features for the drives, the method being accomplished by:
   from a computer-readable medium device, receiving a description of first and second features of the computer-readable medium device, the first feature being other than an identification of the computer-readable medium device, and the computer-readable medium device being a compact disc device;
   in response to the description, configuring a program for managing access by the computing system to the computer-readable medium device, without relying on the identification of the computer-readable medium device; and
   in response to instructions of the configured program, accessing the computer-readable medium device, wherein the first feature includes at least one of write capabilities and digital audio extraction capabilities of the computer-readable medium.

2. The method of claim 1 and comprising:
   to the computer-readable medium device, outputting a request for the description.

3. The method of claim 1 wherein the receiving comprises:
   from the computer-readable medium device, receiving the description, the computer-readable medium device being a digital video disc device.

4. The method of claim 1 wherein the receiving comprises:
   from the computer-readable medium device, receiving the description, the first feature being an indication of whether the computer-readable medium device performs buffer under-run free recording.

5. The method of claim 1 wherein the receiving comprises:
   from the computer-readable medium device, receiving the description, according to a predetermined command set behavior of the computer-readable medium device.

6. The method of claim 1 wherein the receiving comprises:
   from the computer-readable medium device, receiving the description, according to a predetermined format of the description.

7. The method of claim 1 and comprising:
   to the computer-readable medium device, outputting a request for a code;
   from the computer-readable medium device, receiving the code, as an indication that the computer-readable medium device complies with a specification represented by the code; and
   in response to receiving the code, receiving the description from the computer-readable medium device.

8. The method of claim 1, wherein the configured program is a first program, and comprising:
   to the computer-readable medium device, outputting a request for a code;
   in response to an absence of receiving the code from the computer-readable medium device, as an indication that the computer-readable medium device does not comply with a specification represented by the code, determining whether a second program is accessible to the computing system for managing access by the computing system to the computer-readable medium device; and
   in response to the second program being accessible, accessing the computer-readable medium device in response to instructions of the second program.

9. A computing system, comprising:
   means for reporting write capabilities and digital audio extraction capabilities;
   means for unifying command set behavior of CD-R/RW drives in the system; and
   means for specifying a minimum set of features for the drives, the system including:
      a computer-readable medium device; and
      at least one computing device for:
         from the computer-readable medium device, receiving a description of first and second features of the computer-readable medium device, the first feature being other than an identification of the computer-readable medium device, wherein the computer-readable medium device is a compact disc device;
         in response to the description, configuring a program for managing access by the computing system to the computer-readable medium device, without relying on the identification of the computer-readable medium device; and
         in response to instructions of the configured program, accessing the computer-readable medium device, wherein the first feature includes at least one of write capabilities and digital audio extraction capabilities of the computer-readable medium.

10. The system of claim 9 wherein the computing device is for:
   to the computer-readable medium device, outputting a request for the description.

11. The system of claim 9 wherein the computer-readable medium device is a digital video disc device.

12. The system of claim 9 wherein the receiving comprises:
   from the computer-readable medium device, receiving the description, the first feature being an indication of whether the computer-readable medium device performs buffer under-run free recording.

13. The system of claim 9 wherein the computing device is for:
   from the computer-readable medium device, receiving the description, according to a predetermined command set behavior of the computer-readable medium device.

14. The system of claim 9 wherein the computing device is for:
   from the computer-readable medium device, receiving the description, according to a predetermined format of the description.

15. The system of claim 9 wherein the computing device is for:
   to the computer-readable medium device, outputting a request for a code;
   from the computer-readable medium device, receiving the code, as an indication that the computer-readable medium device complies with a specification represented by the code; and
   in response to receiving the code, receiving the description from the computer-readable medium device.

16. The system of claim 9, wherein the configured program is a first program, and wherein the computing device is for:
   to the computer-readable medium device, outputting a request for a code;
   in response to an absence of receiving the code from the computer-readable medium device, as an indication that the computer-readable medium device does not comply with a specification represented by the code, determining whether a second program is accessible to the computing system for managing access by the computing system to the computer-readable medium device; and in response to the second program being accessible, accessing the computer-readable medium device in response to instructions of the second program.

17. A computing system comprising:

a computing device;

a CD-R/RW drive and a computer readable medium accessed by the computing device to provide information, the information describing:

the drive's write capabilities including speed and an indication of whether the drive executes a predetermined write strategy for the computer readable medium, an indication of whether the drive performs buffer under-run free recording, and the drive's digital audio extraction capabilities according to a predetermined format; and in response to the information, a program being configured by the computing device for managing access to the computing device, whereby the computing device operates without relying on a list of supported CD-R/RW drives in a static drive table, with full support of features of the CD-R/RW drive, and with a single configured driver to support a variety of CD-R/RW drives.

* * * * *